(12) United States Patent
Regnier et al.

(10) Patent No.: US 7,447,229 B2
(45) Date of Patent: Nov. 4, 2008

(54) METHOD FOR PROVIDING PRIORITIZED DATA MOVEMENT BETWEEN ENDPOINTS CONNECTED BY MULTIPLE LOGICAL CHANNELS

(75) Inventors: Greg J. Regnier, Portland, OR (US); Jeffrey M. Butler, Beaverton, OR (US); Dave B. Minturn, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 566 days.

(21) Appl. No.: 10/973,306

(22) Filed: Oct. 27, 2004

(65) Prior Publication Data

US 2005/0058147 A1    Mar. 17, 2005

Related U.S. Application Data

(63) Continuation of application No. 09/461,728, filed on Dec. 16, 1999, now abandoned.

(51) Int. Cl.
*H04L 12/26* (2006.01)
*H04L 12/56* (2006.01)

(52) U.S. Cl. ................... 370/439; 370/414; 370/418
(58) Field of Classification Search ................ None
See application file for complete search history.

(56) References Cited

U.S. PATENT DOCUMENTS

| | | | |
|---|---|---|---|
| 4,914,650 A | 4/1990 | Sriram | |
| 5,497,371 A | 3/1996 | Ellis et al. | |
| 5,790,522 A | 8/1998 | Fichou et al. | |
| 5,872,769 A | 2/1999 | Caldara et al. | |
| 5,940,375 A | 8/1999 | Soumiya et al. | |
| 6,067,298 A | 5/2000 | Shinohara | |
| 6,421,742 B1 | 7/2002 | Tillier | |
| 6,438,135 B1 | 8/2002 | Tzeng | |
| 6,570,850 B1 | 5/2003 | Gutierrez et al. | |

OTHER PUBLICATIONS

NGIO Forum, Next Generation I/O Link Architecture Specification: Link Specification, Copyright NGIO Forum 1999, Mar. 26, 1999, pp. 1-84.
NGIO Forum, Next Generation I/O Link Architechture Specification: HCA Specification, Copyright NGIO Forum 1999, Mar. 26, 1999, pp. 1-58.

*Primary Examiner*—Chi H. Pham
*Assistant Examiner*—Soon D. Hyun
(74) *Attorney, Agent, or Firm*—Grossman, Tucker, Perreault & Pfleger, PLLC

(57) ABSTRACT

A data network and a method for providing prioritized data movement between endpoints connected by multiple logical channels. Such a data network may include a first node comprising a first plurality of first-in, first-out (FIFO) queues arranged for high priority to low priority data movement operations; and a second node operatively connected to the first node by multiple control and data channels, and comprising a second plurality of FIFO queues arranged in correspondence with the first plurality of FIFO queues for high priority to low priority data movement operations via the multiple control and data channels; wherein an I/O transaction is accomplished by one or more control channels and data channels created between the first node and the second node for moving commands and data for the I/O transaction during the data movement operations, in the order from high priority to low priority.

38 Claims, 5 Drawing Sheets

METHOD FOR PROVIDING PRIORITIZED DATA MOVEMENT BETWEEN ENDPOINTS CONNECTED BY MULTIPLE LOGICAL CHANNELS

This application is a continuation of U.S. patent application Ser. No. 09/461,728, filed Dec. 16, 1999 now abandoned, which is incorporated herein by reference in its entirety.

TECHNICAL FIELD

The present invention relates to a data network, and more particularly, relates to a method for providing prioritized data movement between endpoints connected by multiple logical point-to-point channels in such a data network.

BACKGROUND

A data network is generally consisted of a network of nodes connected by point-to-point links. Each physical link may support a number of logical point-to-point channels. Each channel may be a bi-directional communication path for allowing commands and data to flow between two connect nodes (e.g., hosts, I/O units and switch/switch elements) within the network. Each channel may refer to a single point-to-point connection where data may be transferred between endpoints (e.g., hosts and I/O units) in strict first-in, first-out (FIFO) order. Data may be transmitted in packets including groups called cells from source to destination often through intermediate nodes. In many data networks, cells between two endpoints (e.g., hosts and I/O units) may transverse the network along a given channel to ensure that cells are delivered in the order in which they were transmitted. However, strict FIFO ordering of messages in such a data network causes a well known problem called "head-of-line blocking." Usually the "head-of-line blocking" problem arises when a high priority message is queued onto the tail of a FIFO queue, and has to wait for all other messages to be processed before the high priority message may reach the head of the FIFO queue for processing. As a result, the overall performance of the data network can be significantly degraded.

Therefore, there is a need for a more flexible, cost-effective, priority-driven and performance-efficient technique for providing prioritized data movement between endpoints connected by multiple logical channels in a data network.

SUMMARY

Accordingly, various embodiments of the present invention are directed to a data network and a method for providing prioritized data movement between endpoints connected by multiple logical channels in a data network. Such a data network may include a first node comprising a first plurality of first-in, first-out (FIFO) queues arranged for high priority to low priority data movement operations; and a second node operatively connected to the first node by multiple control and data channels, and comprising a second plurality of FIFO queues arranged in correspondence with the first plurality of FIFO queues for high priority to low priority data movement operations via the multiple control and data channels; wherein an I/O transaction is accomplished by one or more control channels and data channels created between the first node and the second node for moving commands and data for the I/O transaction during the data movement operations, in the order from high priority to low priority.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein.

DETAILED DESCRIPTION

The present invention is applicable for use with all types of computer networks, I/O channel adapters and chipsets, including follow-on chip designs which link together end stations such as computers, servers, peripherals, storage devices, and communication devices for data communications. Examples of such computer networks may include a local area network (LAN), a wide area network (WAN), a campus area network (CAN), a metropolitan area network (MAN), a global area network (GAN) and a system area network (SAN), including newly developed computer networks using Next Generation I/O (NGIO) and Future I/O (FIO) and Server Net and those networks which may become available as computer technology advances in the future. LAN system may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on priority use of data movement in a simple data network having several example nodes (e.g., end stations including computers, servers and I/O units) interconnected by corresponding links in compliance with the "Next Generation I/O Architecture" for link specification and switch specification as set forth by the NGIO Forum on Mar. 26, 1999, although the scope of the present invention is not limited thereto.

Figure 1:
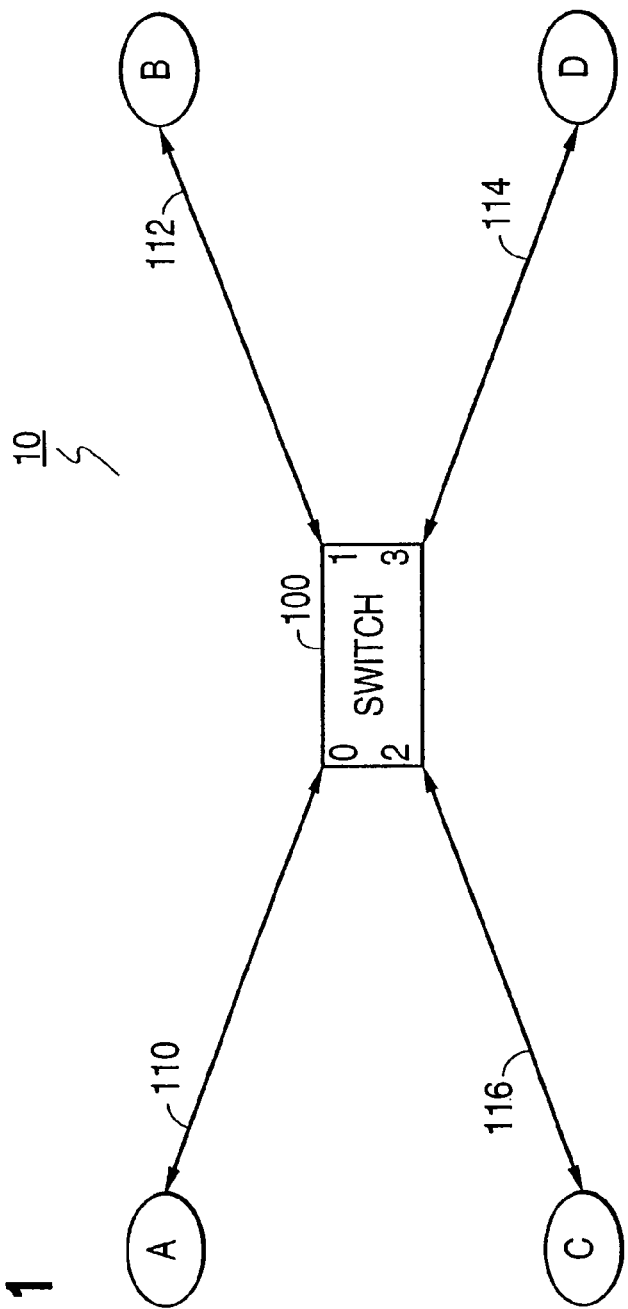
FIG. 1 illustrates an example data network having several nodes interconnected by corresponding links of a basic switch.

Attention now is directed to the drawings and particularly to FIG. 1, a simple data network 10 having several interconnected nodes for data communications according to an embodiment of the present invention is illustrated. As shown in FIG. 1, the data network 10 may include, for example, one or more centralized switches 100 and four different nodes A, B, C, and D. Each node (endpoint) may correspond to one or more I/O units and host systems including computers and/or servers. I/O unit may include one or more I/O controllers connected thereto. Each I/O controller may operate to control one or more I/O devices such as storage devices (e.g., hard disk drive and tape drive).

The centralized switch 100 may contain switch ports 0, 1, 2, and 3 each connected to a corresponding node of the four different nodes A, B, C, and D via a corresponding physical link 110, 112, 114, and 116. Each physical link may support a number of logical point-to-point channels. Each channel may be a bi-directional communication path for allowing commands and data to flow between two connect nodes (e.g., host systems, I/O units and switch/switch. elements) within the network. Each channel may refer to a single point-to-point connection where data may be transferred between endpoints (e.g., host systems and I/O units) in strict first-in, first-out (FIFO) order. The centralized switch 100 may also contain routing information using, for example, explicit routing and/ or destination address routing for routing data from a source node (data transmitter) to a destination node (data receiver) via corresponding link(s), and re-routing information for redundancy.

The specific number and configuration of end stations (e.g., host systems and I/O units), switches and links shown in FIG. 1 is provided simply as an example data network. A wide variety of implementations and arrangements of an number of end stations (e.g., host systems and I/O units), switches and links in all types of data networks may be possible.

According to an example embodiment or implementation, the end stations (e.g., host systems and I/O units) of the example data network shown in FIG. 1 may be compatible with the "Next Generation Input/Output (NGIO) Specification" as set forth by the NGIO Forum on Mar. 26, 1999. According to the NGIO Specification, the switch 100 may be an NGIO fabric, and the end station may be a host system including one or more host channel adapters (HCAs) or an I/O unit including one or more target channel adapters (TCAs).

Figure 2:
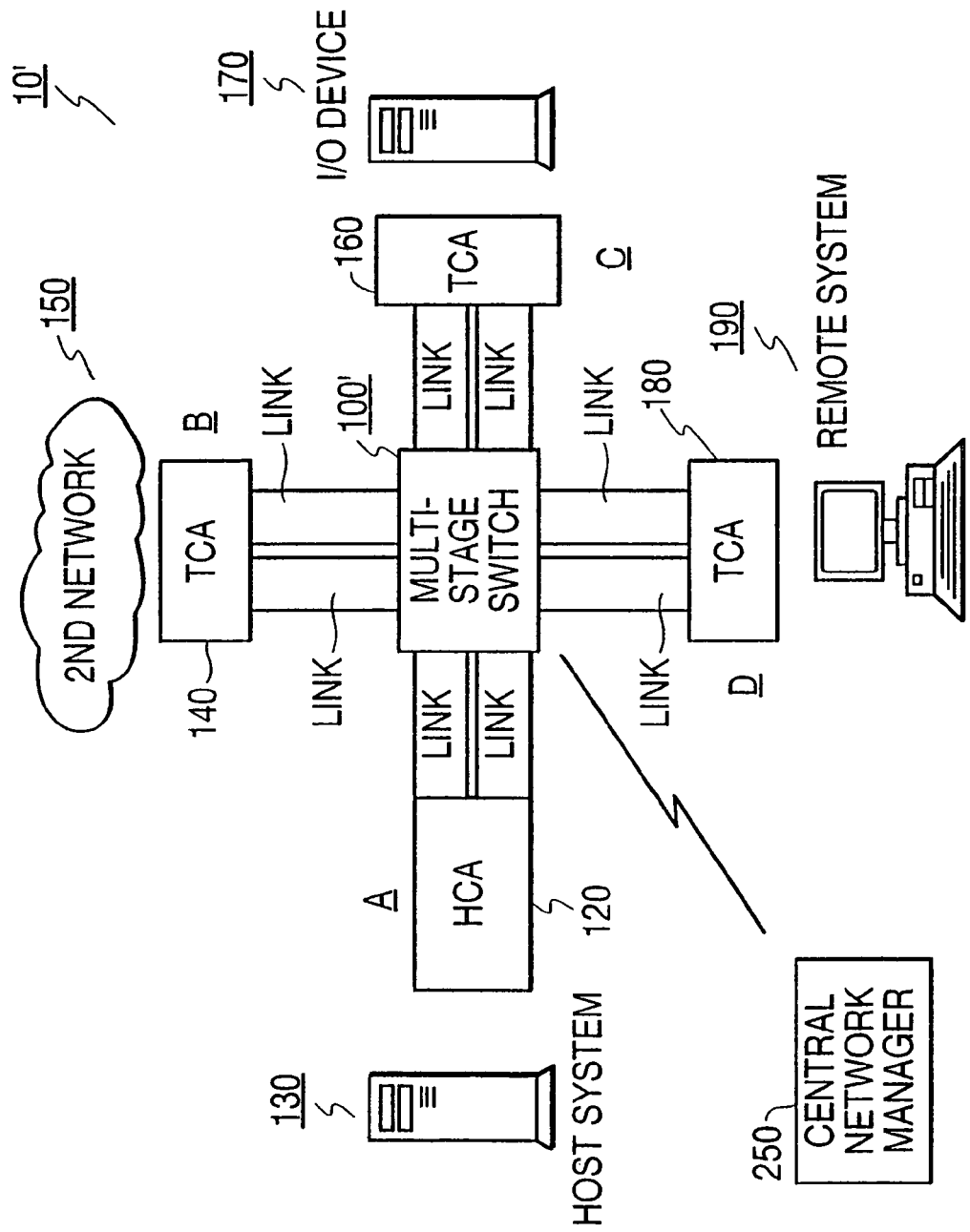
FIG. 2 illustrates another example data network having several nodes interconnected by corresponding links of a multi-stage switch.

For example, FIG. 2 illustrates an example data network 10' using an NGIO architecture to transfer data from a source node to a destination node according to an embodiment of the present invention. As shown in FIG. 2, the data network 10' includes a multi-stage switch 100' comprised of a plurality of switches for allowing a host system and a target system to communicate to a large number of other host systems and target systems. In addition, any number of end stations, switches and links may be used for relaying data in groups of cells between the end stations and switches via corresponding NGIO links.

For example, node A may represent a host system 130. Similarly, node B may represent another network, including, but are not limited to, local area network (LAN), wide area network (WAN), Ethernet, ATM and fibre channel network, that is connected via high speed serial links. Node C may represent an I/O unit 170. Likewise, node D may represent a remote system 190 such as a computer or a server. Alternatively, nodes A, B, C, and D may also represent individual switches of the multi-stage switch 100' which serve as intermediate nodes between the host system 130 and the target systems 150, 170 and 190.

The multi-state switch 100' may include a central network manager 250 connected to all the switches for managing all network management functions. However, the central network manager 250 may alternatively be incorporated as part of either the host system 130, the second network 150, the I/O unit 170, or the remote system 190 for managing all network management functions. In either situation, the central network manager 250 may be configured for learning network topology, determining the switch table or forwarding database, detecting and managing faults or link failures in the network and performing other network management functions.

A host channel adapter (HCA) 120 may be used to provide an interface between a memory controller (not shown) of the host system 130 and a multi-stage switch 100' via high speed serial NGIO links. Similarly, target channel adapters (TCA) 140 and 160 may be used to provide an interface between the multi-stage switch 100' and an I/O controller of either a second network 150 or an I/O unit 170 via high speed serial NGIO links. Separately, another host channel adapter (HCA) 180 may be used to provide an interface between a memory controller (not shown) of the remote system 190 and the multi-stage switch 100' via high speed serial NGIO links. Both the host channel adapter (HCA) and the target channel adapter (TCA) may be implemented in compliance with "Next Generation I/O Link Architecture Specification: HCA Specification, Revision 1.0" as set forth by NGIO Forum on Jul. 20, 1999 for enabling the endpoints (nodes) to communicate to each other over an NGIO channel(s). However, NGIO is merely one example embodiment or implementation of the present invention, and the invention is not limited thereto. Rather, the present invention may be applicable to a wide variety of data networks, hosts and I/O units.

The source node (data transmitter) may communicate with the destination node (data receiver) using a Virtual Interface Architecture (VI-A) in compliance with the "Virtual Interface (VI) Architecture Specification, Version 1.0," as set forth by Compaq Corp., Intel Corp., and Microsoft Corp., on Dec. 16, 1997. The VI Specification defines mechanisms for low-latency, high-bandwidth message-passing between interconnected nodes. Low latency and sustained high bandwidth may be achieved by avoiding intermediate copies of data and bypassing an operating system when sending and receiving messages. Other architectures may also be used to implement the present invention.

Figure 3:
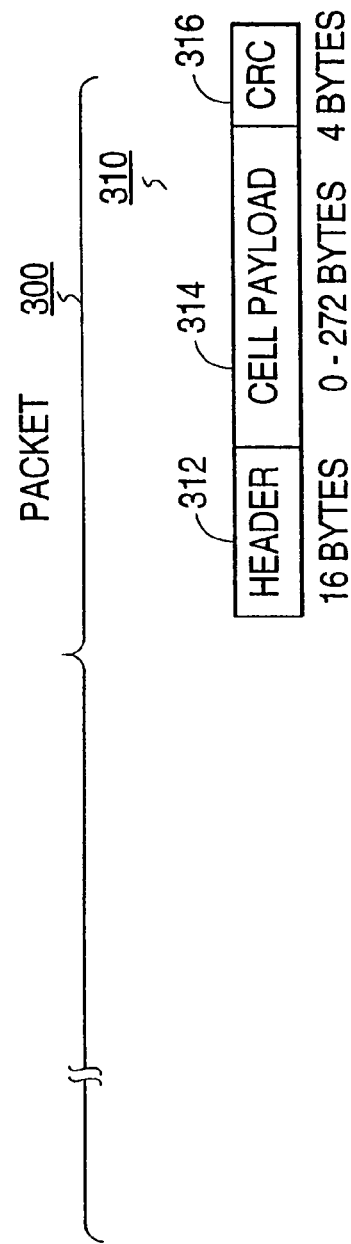
FIG. 3 illustrates an example data in groups of cells for communications according to an embodiment of the present invention.

FIG. 3 illustrates an embodiment of packet and cell formats of data transmitted from a source node (data transmitter) to a destination node (data receiver) through switches and/or intermediate nodes according to the "Next Generation I/O Link Architecture Specification." As shown in FIG. 3, a packet 300 may represent a sequence of one or more cells 310. Each cell 310 may include a fixed format header information 312, a variable format cell payload 314 and a cyclic redundancy check (CRC) information 316 The header information 312 may consist of 16 bytes of media control access information which specifies cell formation, format and validation. Each cell payload provides appropriate packet fields plus up to 256 bytes of data payload. The cell CRC may consist of 4-bytes of checksum for all of the data in the cell. Accordingly, the maximum size cell as defined by NGIO specification may be 292 bytes (256-byte Data Payload, 16-byte Header, 16-Byte Virtual Address/Immediate data, and 4-byte CRC).

Figure 4:
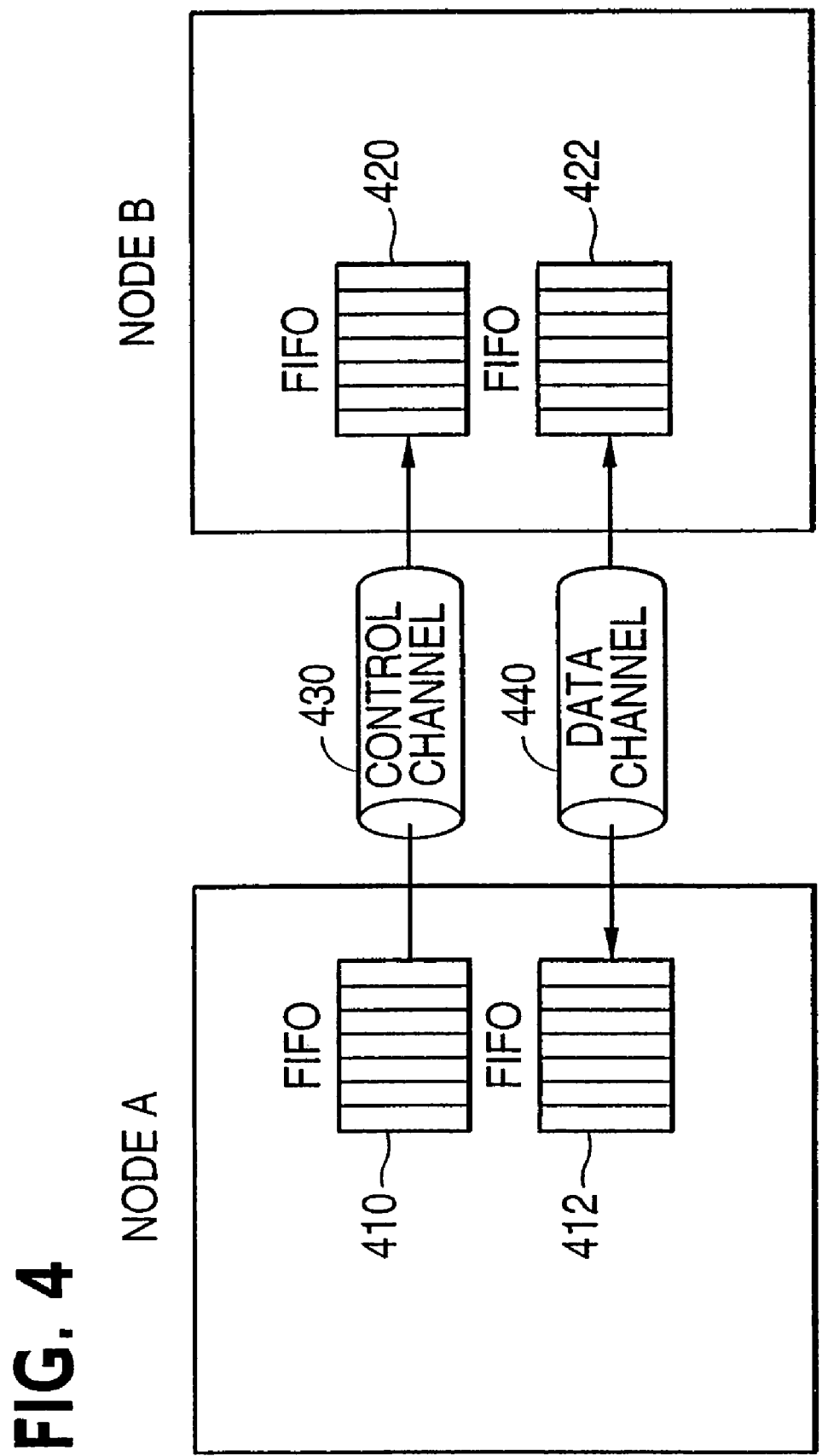
FIG. 4 illustrates an example data transfer between channel endpoints, for example, source node A and destination node B shown in FIGS. 1-2 connected by multiple logical point-to-point channels in strict first-in, first-out (FIFO) order.

FIG. 4 illustrates an example data transfer between channel endpoints, for example, source node A (a particular host) and destination node B (an I/O unit) as shown in FIGS. 1-2 connected by multiple logical point-to-point channels in strict first-in, first-out (FIFO) order. These point-to-point channels may be directly supported by the Virtual Interface Architecture (VI-A) and NGIO. Many networking protocols (for example, Internet Protocol TCP/IP) provide for multiple priorities of traffic to allow for varying types of information to pass between endpoints with varying precedence. Point-topoint connections as presented by the Virtual Interface Architecture (VIA) and the NGIO initiative provide only for FIFO ordering of messages. However, strict FIFO ordering as described, causes a "head-of-line blocking" problem. This is because when a high priority message is queued onto the tail of a FIFO queue, such high priority message has to wait for all other messages to be processed before it reaches the head of the queue for processing. As a result, the overall performance of the data network can be significantly degraded.

As shown in FIG. 4, node A may include, for example, physical FIFO queues (work queues) 410 and 412 for either en-queuing or de-queuing data transfer requests and actual data transfer. Likewise, node B may include, for example, physical FIFO queues 420 and 422 for either en-queuing or de-queuing data transfer requests and actual data transfer. A logical I/O transaction between node A and node B may be accomplished by two channels 430 and 440, one channel for control and another channel for data. Each I/O transaction may consist of a I/O request for I/O services followed by data transfer (if indicated by the I/O service request) and a completion notification returned to the source node (initiator) of the I/O service request. The control channel 430 may support commands that describe data movement operations (i.e., sending I/O request and I/O reply messages). The data channel 440 actually moves the data between node A and node B. Since separate channels 430 and 440 are used for data transfer between channel endpoints, neither request nor reply messages need to wait for large blocks of data transmission between node A and node B. However, the "head-of-line blocking" and FIFO order will not allow prioritizing data once the data is queued on the control channel 430.

Figure 5:
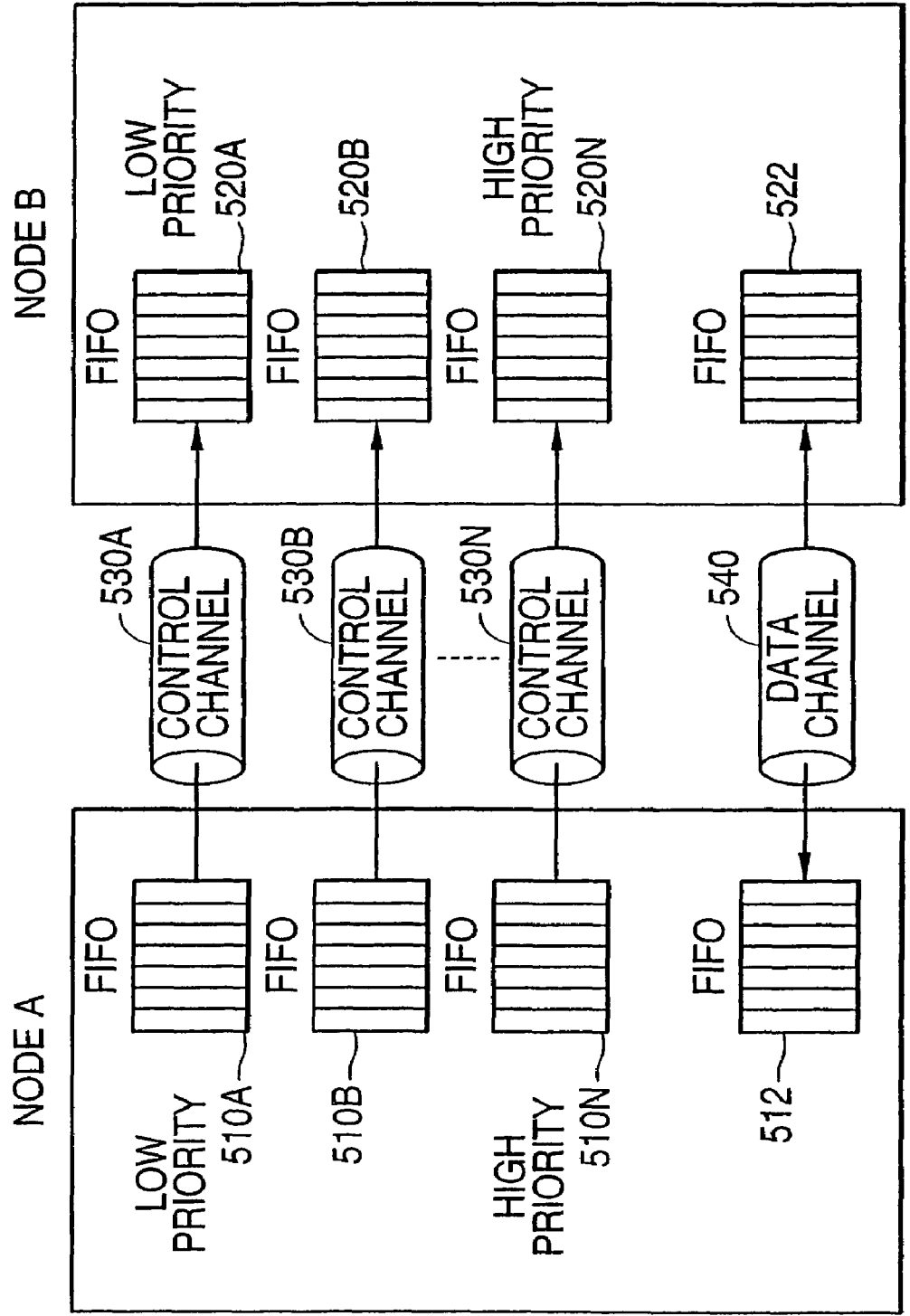
FIG. 5 illustrates an example implementation of data transfer between channel endpoints, source node A and destination node B connected by multiple logical point-to-point channels in first-in, first-out (FIFO) order to provide prioritized processing of data movement operations according to an embodiment of the present invention.

Turning now to FIG. 5, the data transfer between channel endpoints, for example, source node A (a particular host) and destination node B (an I/O unit) connected by multiple logical point-to-point channels in first-in, first-out (FIFO) order to provide prioritized processing of data movement operations according to an embodiment of the present invention is illustrated. As shown in FIG. 5, node A may include, for example, physical FIFO queues (work queue in strict FIFO order) 510A-510N in an order of priority (from high priority to low priority) and FIFO queue 512 for either en-queuing or de-queuing commands (data transfer requests) and actual data transfer. Likewise, node B may include, for example, physical FIFO queues 520A-520N in an order of priority (from high priority to low priority) and FIFO queue 522 for either en-queuing or de-queuing commands (data transfer requests) and actual data transfer. A logical I/O transaction may be accomplished by a plurality of control channels 530A-530B created between node A and node B strictly for sending I/O request and I/O reply messages in the order from high priority to low priority, and a single data channel 540 created for moving data between node A and node B. Multiple control channels 530A-530B are used to prioritize command processing. Each control channel can be assigned a logical priority by the node (node A or node B) that is en-queuing the commands to be executed. For example, if assuming that only two priorities (high and low FIFO queues 510A and 510N) are used, the node (node A or node B) that is en-queuing commands can use the low priority queue (for example, FIFO queue 510A) for normal traffic, and the high priority queue (for example, FIFO queue 510N) for urgent traffic. This allows high priority commands to move across the control channel while avoiding blocking behind low priority traffic.

The specific number and configuration of FIFO queues and point-to-point channels between node A and node B shown in FIG. 5 is provided simply as an example priority level of data movement between endpoints in an example data network. A wide variety of implementations and arrangements of any number of data channels and control channels between endpoints in all types of data networks may be possible. For example, the priority model shown in FIG. 5 can also be extended to allow for multiple data channels, each assigned a different priority level. This allows for prioritized data to be mapped onto prioritized data channels, and for data of differing priorities to move independently across different data channels between endpoints in an example data network.

Figure 6:
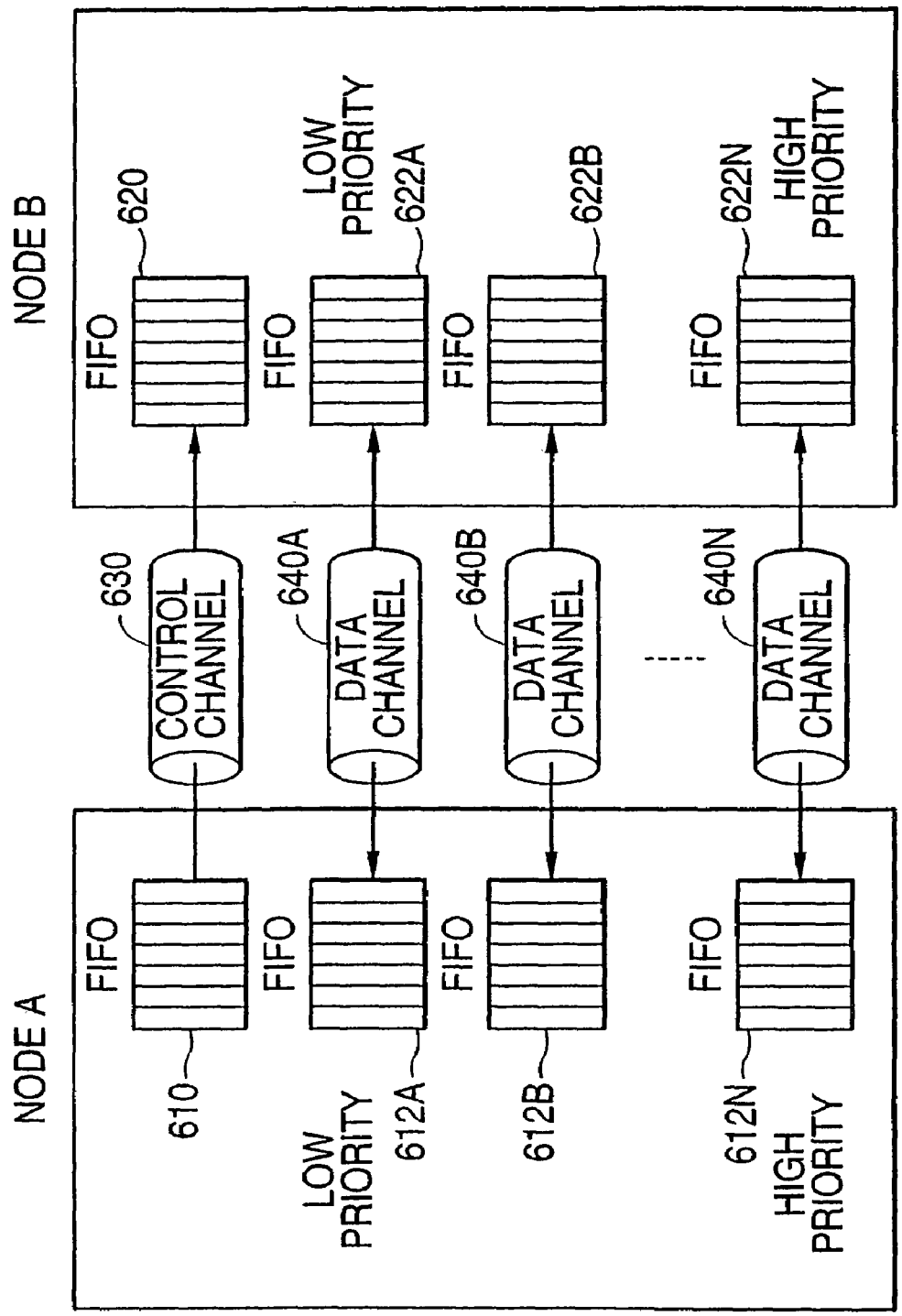
FIG. 6 illustrates an example implementation of data transfer between channel endpoints, source node A and destination node B connected by multiple logical point-to-point channels in first-in, first-out (FIFO) order to provide prioritized processing of data movement operations according to another embodiment of the present invention.

FIG. 6 illustrates the data transfer between channel endpoints, for example, source node A (a particular host) and destination node B (an I/O unit) connected by multiple logical point-to-point channels in first-in, first-out (FIFO) order to provide prioritized processing of data movement operations according to another embodiment of the present invention. As shown in FIG. 6, node A may include a FIFO queue (work queue in strict FIFO order) 610 and FIFO queues 612A-612N in an order of priority (from high priority to low priority) for either en-queuing or de-queuing commands (data transfer requests) and actual data transfer. Likewise, node B may include a FIFO queue 620 and FIFO queues 622A-622N in an order of priority for either en-queuing or de-queuing commands (data transfer requests) and actual data transfer.

A logical I/O transaction may be accomplished by a single control channel 630 created between node A and node B strictly for sending I/O request and I/O reply messages, and a plurality of data channels 640A-640N created for moving data between node A and node B in the order from high priority to low priority. A single control channel 630 may be sufficient and desirable, but data transfer spread between multiple data channels 640A-640N can significantly decrease latency and increase bandwidth. Moreover, dividing data transfer between different data channels may help overall I/O responsiveness and distribute even loading in the data network. Multiple data channels 640A-640N are used to prioritize data processing. Each data channel can be assigned a logical priority by the node (node A or node B) that is en-queuing the data to be transferred. The number of data channels used for data movement between node A and node B may be assigned by any given node when the channels are created.

If node A and node B are channel endpoints (e.g., host systems and I/O units) of an example data network shown in FIG. 2 implemented in compliance with the "Next Generation Input/Output (NGIO) Specification", each cell may contain a 3-bit priority indication as part of the 16 byte Media Access Control (MAC) header shown in FIG. 3 for providing, for example, a maximum eight (8) levels of priority. However, currently only five of the eight possible combinations are defined by NGIO protocol. The highest level priority may be reserved for management packets. The lowest level priority may be Priority "0" for best effort. Next to the lowest priority may be Priority "1" for privileged best effort, Priority "2" for negotiated normal latency, and Priority "3" for negotiated minimum latency. Management class of service may be provided to allow system administrators to communicate with all nodes connected to the NGIO fabric. These priorities may be absolute, meaning that a higher priority will always preempt a lower priority.

For example, source node A may transmit all data from FIFO queues configured to transmit at management service before any data is sent from FIFO queues configured to transmit at best effort or privileged best effort service. Each FIFO queue shown in FIGS. 5 and 6 may be assigned to one of the five priorities based on the end-to-end class-of-service and/or the quality-of-service desired for that FIFO queue. Each node (node A or node B) may include one or more channel adapters configured with a multiplexing function based on priority for multiplexing and transmitting back to back cells of the same priority from multiple FIFO queues through the assigned control or data channels.

As described from the foregoing, the present invention advantageously provides a unique cost-effective and performance-efficient solution for prioritized data movement between endpoints connected by multiple logical channels in a data network. Such a prioritized data movement solution is especially important for connections between a host computer and a node that provides inter-networking to external networks running industry standard protocols such as TCP/IP. Moreover, such a prioritized data movement solution is also critical for implementation of networking products that allow for end-to-end class-of-service and/or quality-of-service between an NGIO based host computer and another computer on a LAN or WAN.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the present invention is applicable to all types of redundant type networks, including, but is not limited to, Next Generation Input/Output (NGIO), ATM, SAN (system area network or storage area network), server net, Future Input/Output (FIO), fiber channel, and Ethernet. Many modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A network comprising:
a first node comprising a first plurality of first-in, first-out (FIFO) queues arranged for high priority to low priority data movement operations; and
a second node operatively connected to said first node by multiple control and data channels, said second node comprising a second plurality of FIFO queues arranged in correspondence with said first plurality of FIFO queues for high priority to low priority data movement operations via said multiple control and data channels; and
an I/O transaction is to be accomplished by one or more control channels and data channels to move commands and data separately between said first node and said second node during said data movement operations, in the order from high priority to low priority;
said first node and said second node being channel endpoints of the network implemented in compliance with the "Next Generation Input/Output (NGIO) Specification".

2. A network as claimed in claim 1, wherein said control channels are to be used to prioritize command processing, and each control is to be assigned with a different priority by one of the nodes that is en-queuing the commands to be executed based on the quality of service desired.

3. A network as claimed in claim 2, wherein said first plurality of FIFO queues include a high priority FIFO queue provided to queue commands for urgent traffic, a low priority FIFO queue provided to queue commands for normal traffic, and another FIFO queue provided to queue data for data movement operations.

4. A network as claimed in claim 2, wherein said data is spread between multiple data channels to prioritize data processing while concomitantly to decrease latency and increasing bandwidth during said data movement operations.

5. A network as claimed in claim 1, wherein said data is transmitted in groups of cells with each cell having a header utilized for indicating whether the cell is transmitted in a priority order.

6. A network as claimed in claim 5, further comprising a multi-stage switch which comprises a plurality of different routes to connect said first node and said second node for data movement operations.

7. A network as claimed in claim 5, wherein each of said first node and said second node comprises one or more channel adapters including a multiplexing function based on a priority order to multiplex and transmit back to back cells of the same priority from multiple FIFO queues through assigned control or data channels.

8. A network as claimed in claim 1, wherein said multiple control and data channels are directly supported by the "Virtual Interface (VI) Architecture Specification" for multiple priorities of traffic to allow for varying types of information to pass between endpoints with varying precedence.

9. A network as claimed in claim 1, wherein said control channels are to be used to prioritize command processing, and each control is to be assigned with a different priority by one of the nodes that is en-queuing the commands to be executed based on the quality of service desired.

10. A network as claimed in claim 9, wherein said first plurality of FIFO queues include a high priority FIFO queue provided to queue commands for urgent traffic, a low priority FIFO queue provided to queue commands for normal traffic, and another FIFO queue provided to queue data for data movement operations.

11. A network as claimed in claim 9, wherein said data is spread between multiple data channels to prioritize data processing while concomitantly to decrease latency and increasing bandwidth during said data movement operations.

12. A network as claimed in claim 1, wherein said data is transmitted in groups of cells with each cell having a header utilized for indicating whether the cell is transmitted in a priority order.

13. A network as claimed in claim 12, further comprising a multi-stage switch which comprises a plurality of different routes to connect said first node and said second node for data movement operations.

14. A network as claimed in claim 12, wherein each of said first node and said second node comprises one or more channel adapters including a multiplexing function based on a priority order to multiplex and transmit back to back cells of the same priority from multiple FIFO queues through assigned control or data channels.

15. A network as claimed in claim 1, wherein said multiple control and data channels are directly supported by the "Virtual Interface (VI) Architecture Specification" and the "Next Generation Input/Output (NGIO) Specification" for multiple priorities of traffic to allow for varying types of information to pass between endpoints with varying precedence.

16. A network arrangement comprising:
a host system;
at least one remote system;
a switch fabric comprising a plurality of different switches which interconnect said host system to said remote system along different control and data channels for data movement operations;
said host system comprising multiple first-in, first-out (FIFO) queues arranged for high priority to low priority data movement operations; and said remote system comprising multiple first-in, first-out (FIFO) queues arranged in correspondence with said host system multiple FIFO queues for high priority to low priority data movement operations; and an I/O transaction to be accomplished by one or more control channels and data channels created to move commands and data separately between said host system and said remote system during said data movement operations, in the order from high priority to low priority;

said host system and said remote system being channel endpoints of the network arrangement implemented in compliance with the "Next Generation Input/Output (NGIO) Specification".

17. A network arrangement as claimed in claim 16, wherein said control channels are used to prioritize command processing, and each control channel is assigned with a different priority by one of the systems that is en-queuing the commands to be executed based on the quality of service desired.

18. A network arrangement as claimed in claim 16, wherein said FIFO queues of one of said host system and said remote system include a high priority FIFO queue provided to queue commands for normal traffic, and another FIFO queue provided to queue data for data movement operations.

19. A network arrangement as claimed in claim 16, wherein said data is to be transmitted from said host system to said remote system in groups of cells with each cell having a header utilized to indicate whether the cell is transmitted in a priority order.

20. A network arrangement as claimed in claim 19, wherein each of said host system and said remote system comprises one or more channel adapters configured with a multiplexing function based on a priority order to multiplex and transmit back to back cells of the same priority from multiple FIFO queues through assigned control or data channels.

21. A network arrangement as claimed in claim 16, wherein said data is spread between multiple data channels to prioritize data processing while concomitantly to decrease latency and increase bandwidth during said data movement operations.

22. A network arrangement as claimed in claim 16, wherein said multiple control and data channels are directly supported by the "Virtual Interface (VI) Architecture Specification" for multiple priorities of traffic to allow for varying types of information to pass between said host system and said remote system with varying precedence.

23. A network arrangement as claimed in claim 16, wherein said control channels are used to prioritize command processing, and each control channel is assigned with a different priority by one of the systems that is en-queuing the commands to be executed based on the quality of service desired.

24. A network arrangement as claimed in claim 16, wherein said FIFO queues of one of said host system and said remote system include a high priority FIFO queue provided to queue commands for normal traffic, and another FIFO queue provided to queue data for data movement operations.

25. A network arrangement as claimed in claim 16, wherein said data is to be transmitted from said host system to said remote system in groups of cells with each cell having a header utilized to indicate whether the cell is transmitted in a priority order.

26. A network arrangement as claimed in claim 25, wherein each of said host system and said remote system comprises one or more channel adapters including a multiplexing function based on a priority order to multiplex and transmit back to back cells of the same priority from multiple FIFO queues through assigned control or data channels.

27. A network arrangement as claimed in claim 16, wherein said data is spread between multiple data channels to prioritize data processing while concomitantly to decrease latency and increase bandwidth during said data movement operations.

28. A network arrangement as claimed in claim 16, wherein said multiple control and data channels are directly supported by the "Virtual Interface (VI) Architecture Specification" and the "Next Generation Input/Output (NGIO) Specification" for multiple priorities of traffic to allow for varying types of information to pass between said host system and said remote system with varying precedence.

29. A method comprising: establishing one or more control channels and one or more data channels between a first plurality of first-in, first-out (FIFO) queues in a source node and a second plurality of FIFO queues in a destination node for transferring commands that describe data movement operations from said source node to said destination node and for moving data from said source node to said destination node, said second plurality of FIFO queues arranged in correspondence with said first plurality of FIFO queues;

assigning a logical priority to each control channel for transferring high priority commands to move across the control channel before low priority commands during said data movement operations; and transferring, at said source node, data in groups of cells to said destination node along the data channel;

said source node and said destination node being channel endpoints in a network implemented in compliance with the "Next Generation Input/Output (NGIO) Specification".

30. A method as claimed in claim 29, further comprising:
assigning a logical priority to each data channel for high priority data to move across the data channel before low priority data during said data movement operations; and
moving, at said source node, high priority data in groups of cells to said destination node along the data channel before low priority data during said data movement operations.

31. A method as claimed in claim 29, wherein said data is transmitted from said source node to said destination in groups of cells with each cell having a header utilized for indicating whether the cell is transmitted in a priority order.

32. A method as claimed in claim 29, further comprising:
assigning a logical priority to each data channel for high priority data to move across the data channel before low priority data during said data movement operations; and
moving, at said source node, high priority data in groups of cells to said destination node along the data channel before low priority data during said data movement operations.

33. A method as claimed in claim 29, wherein said data is transmitted from said source node to said destination in groups of cells with each cell having a header utilized for indicating whether the cell is transmitted in a priority order.

34. A node comprising:
a first plurality of first-in, first-out (FIFO) queues arranged for high priority to low priority data movement operations; and
an interface to operatively couple said node to another node by multiple control and data channels, said first plurality of FIFO queues being arranged to correspond with a second plurality of FIFO queues in said another node, such that an I/O transaction is to be accomplished, by one or more control channels and data channels created to move commands and data separately between said node and said another node during said data movement operations, in order from high priority to low priority;

said node and said another node being channel endpoints of a network implemented in compliance with the "Next Generation Input/Output (NGIO) Specification".

35. The node of claim 34, wherein said multiple control channels are used to prioritize command processing, and each control channel is assigned with a different priority by one of the nodes that is en-queuing the commands to be executed based on the quality of service desired.

36. The node of claim 34, wherein said FIFO queues of one of said node and said another node include a high priority FIFO queue provided to queue commands for normal traffic, and another FIFO queue provided to queue data for data movement operations.

37. The node of claim 34, wherein said multiple control channels are used to prioritize command processing, and each control channel is assigned with a different priority by one of the nodes that is en-queuing the commands to be executed based on the quality of service desired.

38. The node of claim 34, wherein said FIFO queues of one of said node and said another node include a high priority FIFO queue provided to queue commands for normal traffic, and another FIFO queue provided to queue data for data movement operations.

* * * * *